March 30, 1943. E. BORTNICK 2,315,309
SOUND ATTACHMENT DEVICE FOR MOTION PICTURE MACHINES
Filed July 9, 1941 2 Sheets-Sheet 1
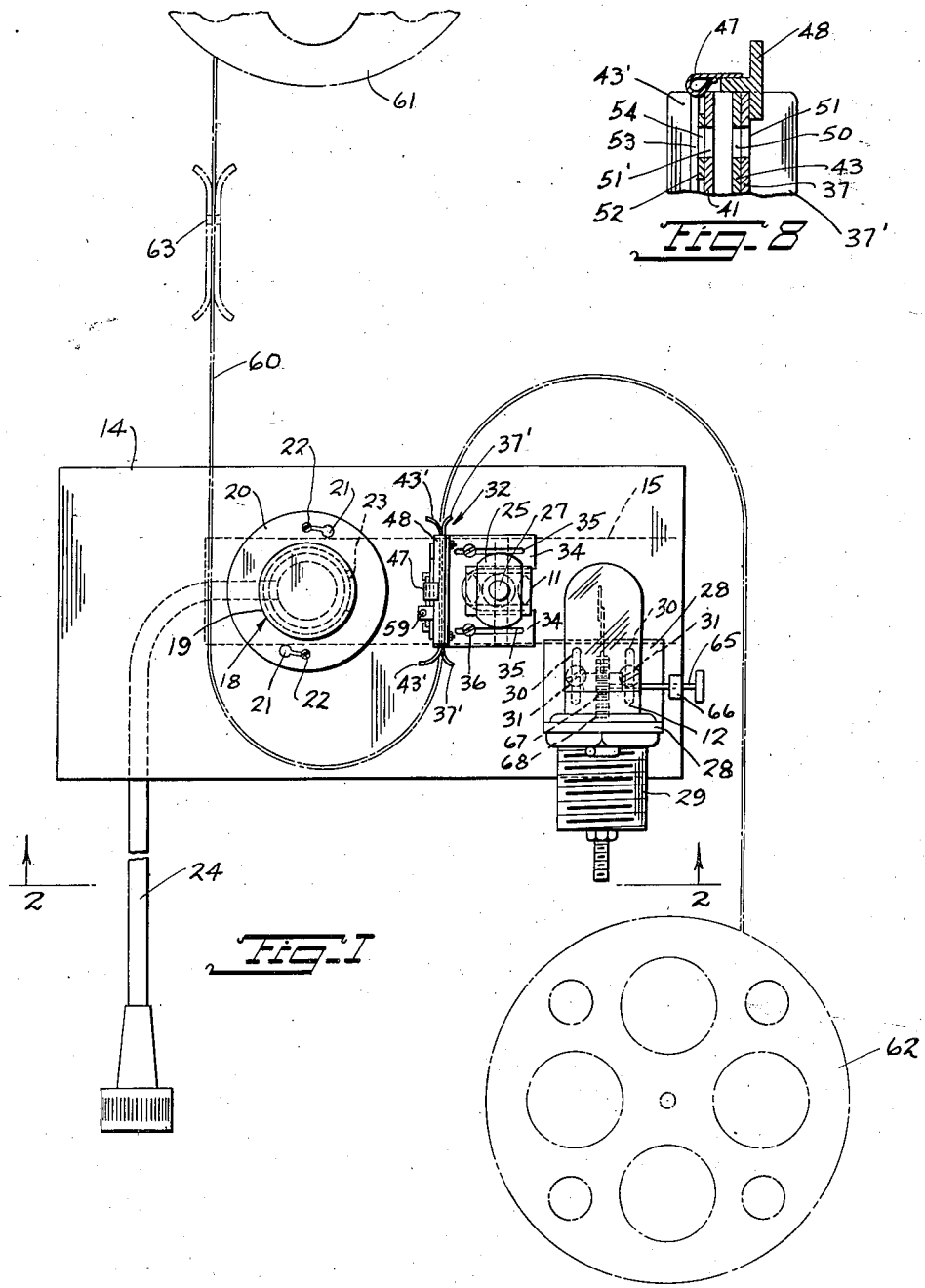
INVENTOR.
EPHIM BORTNICK
BY
ATTORNEY.

March 30, 1943. E. BORTNICK 2,315,309
SOUND ATTACHMENT DEVICE FOR MOTION PICTURE MACHINES
Filed July 9, 1941 2 Sheets-Sheet 2
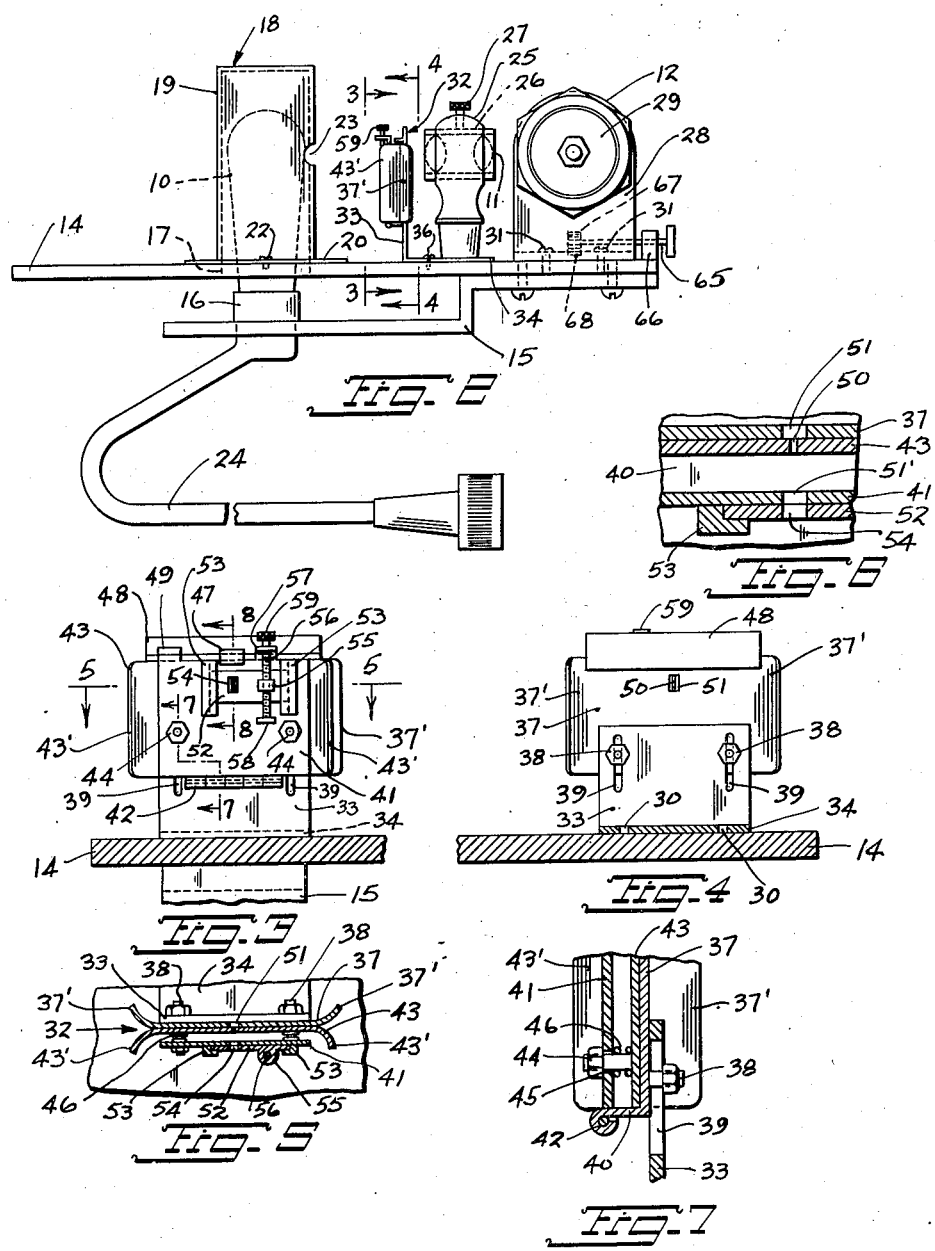
INVENTOR.
EPHIM BORTNICK
BY
ATTORNEY.

Patented Mar. 30, 1943

2,315,309

UNITED STATES PATENT OFFICE 2,315,309

SOUND ATTACHMENT DEVICE FOR MOTION PICTURE MACHINES

Ephim Bortnick, New York, N. Y.

Application July 9, 1941, Serial No. 401,587

4 Claims. (Cl. 179—100.3)

This invention relates to new and useful improvements in a sound attachment for silent motion picture projectors.

More specifically, the invention proposes the construction of a small inexpensive attachment which may be mounted upon or associated with a silent motion picture projector to convert it to a sound motion picture machine.

It is contemplated to so construct the attachment that it may easily be placed by the public on silent motion picture projectors which they already have purchased, or may be placed by dealers or manufacturers on silent motion picture projectors before sale to the public. A feature of converting a silent motion picture machine to a sound motion picture machine, in accordance with this invention, resides in the inexpensive manner in which this may be accomplished. By use of the attachment it is possible to have a sound machine at a fraction of the cost of sound machines now manufactured.

This invention particularly relates to a sound attachment having a photocell, a lens and an exciter lamp. It is proposed that these parts be mounted on a support plate and associated with a novel gate for guiding the sound film in proper relationship with these parts.

In so far as the gate is concerned, it is proposed that it be characterized by film guide plates associated with each other in a certain way and provided with apertures for the passage of light from the exciter lamp to the lens and photocell. It is also proposed to associate a novel shutter with the said apertures so that it is possible to properly control the passage of the light to avoid "airplane noises" and "machine gun noises" which sometime develop in sound projectors due to the passage of light incorrectly through the sound film.

Still further the invention proposes a novel arrangement for mounting the various parts of the attachment in such a way that they may be easily relatively placed to insure a satisfactory operation thereof.

Another object of the invention is the construction of a device as described which is simple and durable and which may be manufactured and sold at a reasonable cost.

For further comprehension of the invention, and of the objects and advantages thereof, references will be had to the following description and accompanying drawings, and to the appended claims in which the various novel features of the invention are more particularly set forth.

In the accompanying drawings forming a material part of this disclosure:

Fig. 1 is a front elevational view of a sound attachment for motion picture projectors constructed in accordance with this invention and schematically associated with a silent motion picture projector.

Fig. 2 is a bottom view of Fig. 1 looking in the direction of the line 2—2 thereof.

Fig. 3 is a fragmentary enlarged vertical sectional view taken on the line 3—3 of Fig. 2.

Fig. 4 is a fragmentary enlarged vertical sectional view taken on the line 4—4 of Fig. 2.

Fig. 5 is a horizontal sectional view taken on the line 5—5 of Fig. 3.

Fig. 6 is a fragmentary enlarged detailed view of a portion of Fig. 5.

Fig. 7 is a fragmentary vertical sectional view taken on the line 7—7 of Fig. 3.

Fig. 8 is a fragmentary enlarged vertical sectional view taken on the line 8—8 of Fig. 3.

The sound attachment for silent motion picture projectors to convert them to sound projectors, in accordance with this invention, includes a photocell 10, a lens 11, and an exciter lamp 12. These parts are mounted in a certain way on a support plate 14. More specifically, a bracket 15 is attached upon the back of the support plate 14 and is provided with a socket 16 for receiving the photocell 10. The plate 14 is provided with an opening 17 through which the photocell 10 projects. A shield 18 is removably mounted on the front of the support plate 14 over the photocell 10.

The shield 18 comprises a hollow casing 19 having an open bottom and a flange 20 surrounding said bottom. This flange 20 has several bayonet openings 21 which are cooperative with headed studs 22 mounted on the plate 14. The casing 19 has an opening 23 in one side through which a beam of light may reach the photocell. The arrangement is such that the shield 18 may be slightly turned to align the large portions of the bayonet slots 21 with the headed studs 22 and then the shield 18 may be lifted up and removed. The photocell 10 may be removed from the socket 16 merely by pulling it upwards in the usual way. The details of this photocell will not be given in this specification as it forms no part of the invention and is generally used in the sound motion picture field. The socket 16 has the usual cable 24 connected with it which must be connected with the sound reproducing mechanism, not shown nor described.

A standard 25 for supporting the lens 11 is mounted on the support plate 14. This standard has a passage 26 through which the lens 11 extends. A fastening screw 27 is threadedly mounted through the standard 25 and abuts the casing of the lens 11 for holding it in position. The set screw 27 may be loosened and then the lens 11 may be moved forwards or rearwards to properly focus the beam of light from the exciter 12 through the opening 23 on the photocell 10.

An L-shaped bracket 28 is mounted on the support plate 14 and supports a socket 29 for removably holding and supporting the exciter lamp 12. The bracket 28 has its bottom arm formed with several parallel slots 30 through which fastening elements 31 pass. These fastening elements have large heads. They are mounted on the support plate 14 and said heads engage the material along the edges of the slots 30. The fastening elements 31 may be loosened and then the bracket 28 may be shifted to properly align the film of the exciter lamp 12 with the lens 11 and the photocell 10. Means is provided to facilitate shifting of said bracket 28. This means includes a headed stem 65 which may be manually turned and which is rotative in a lug 66 on the plate 14. The stem 65 carries a pinion 67 which meshes with a rack 68 on the bottom arm of said bracket 28. When the stem 65 is turned, the bracket 28 will be moved. The fastening elements 31 may thereafter be tightly screwed down again to hold the parts in their new positions. Since the details of the socket 29 form no part of the invention they will be omitted from this specification.

A gate 32 is also provided for the passage of the sound film. This gate includes an L-shaped bracket having a vertical arm 33 and a horizontal arm 34. The horizontal arm 34 has several parallel slots 35 through which headed fastening elements 36 pass. These fastening elements 36 are mounted on the support plate 14. They may be loosened and then the bracket may be shifted to selected positions between the lens 11 and the photocell 10. A film guide plate 37 is adjustably mounted on the vertical arm 33 of said bracket.

More specifically, the film guide plate 37 has several projecting headed elements 38 engaging through parallel slots 39 in the vertical arm 33. The headed elements 38 may be loosened and then the film guide plate 37 may be raised or lowered as desired. The film guide plate 37 has a bottom support ledge 40 upon which the film may rest when passing across the guide plate 37. A member 41 is hingedly mounted on the ledge 40 by a hinge construction 42. Another film guide plate 43 is resiliently mounted on the member 41 and normally engages against the said first-named film guide plate 37. The resilient support of the second-named guide plate 43 is accomplished by several headed elements 44 mounted on the guide plate 43 and extending through openings 45 in the member 41. Small springs 46 are mounted on the headed elements 44 and act between the member 41 and the guide plate 43 for urging the guide plate 43 resiliently against the guide plate 37.

A catch 47 is mounted on a strip 48 which in turn is mounted on the top of the guide plate 37. This catch 47 is in the form of a small leaf spring and normally engages the top edge of the member 41 for holding said member releasably in position. The member 41 has a small projection 49 which may be used as a handle for gripping the member to move it outwards for releasing it from the catch 47. Then the member 41 may be pivoted to its open position to separate the guide plates 43 and 37.

The said film guide plates 43 and 37 and member 41 are provided with aligned apertures 50 and 51, and 51' respectively. The aperture 50 is formed in the guide plate 43 and is a very narrow slit capable of allowing light to pass through one small section of the sound track. The apertures 51 and 51' are somewhat larger than the aperture 50 so as not to interfere with the passage of light.

The film guide plates 43 and 37 have outwardly flared ends 43' and 37', respectively. These flared ends assist in guiding the film between the plates without damage to the film. A shutter 52 is adjustably mounted on the member 41. This shutter is in the form of a small plate slidably mounted between tracks 53 mounted on the member 41. The shutter 52 has an aperture 54 which is alignable with the apertures, 50, 51 and 51'. The shutter 52 is provided with a lug 55 through which a screw 56 threadedly passes. This screw is rotatively supported in lugs 57 and 58 formed on the member 41. The screw 56 is provided with a head 59 by which it may be turned to cause the shutter 52 to move upwards and downwards. The purpose of the shutter 52 is to control the passage of light through the aperture 50 so as to avoid "airplane noise" or "machine gun noise" which would develop if the light does not properly pass through the sound track of the film.

In Fig. 1 the dot and dash lines 60 schematically illustrate the film of a silent motion picture projector associated with the new attachment. This film 60 is shown extended between the top spool 61 and the bottom spool 62 of the projector. Reference numeral 63 schematically indicates the aperture of the motion picture projector. It is necessary that the film 60 be threaded across the aperture 63 and the aperture 50 in such a way that twenty one frames of the film are located between these openings, in the event that the sound track is synchronized twenty one frames behind the motion picture. This is the standard distance generally used. The details of the silent projector will not be given in this specification as it forms no part of the invention. However, the motion picture projector must be of the type having the usual sprockets to feed the film across the aperture 63, and capable of moving the film across the aperture 50. The film must be fed so that the usual sprockets of the machine maintain the frame relationship of the film between the apertures 63 and 50. In the event that the sound track film 60 is of the type having the sound track along one edge in lieu of the usual perforations for the double sprocket, it is necessary that the teeth on one side of the sprockets be filed off.

The sound device works in the usual way. The rays from the exciter lamp 12 pass through the condensing lens 11, and through the sound track of the film, the aperture 50, the opening 23, and strike the photocell 10. This photocell controls the usual sound reproducing device.

The operation of the invention consists in attaching or in any other way mounting the support plate 14 in proper relationship to the film 60 of the silent motion picture projector. The bracket 28 may be adjusted to properly place the exciter lamp 12 in alignment with the lens 11 and the photocell 10. The lens 11 may be adjusted forwards or rearwards to throw the beam of light correctly through the aperture 50 and upon the photocell 10. The gate 32 may be properly adjusted as previously pointed out for the correct operation of the device.

While I have illustrated and described the preferred embodiment of my invention, it is to be understood that I do not limit myself to the precise constructions herein disclosed and the right is reserved to all changes and modifications coming within the scope of the invention as defined in the appended claims.

Having thus described my invention, what I claim as new and desire to secure by United States Letters Patent is:

1. In a device of the class described having an exciter lamp and lens and photocell, a film guide plate having an aperture for the passage of light from said exciter lamp and lens to said photocell, a film guide plate complementary to and engaging against said film guide plate and having an aperture aligned with said aperture, a member mounted on the first named of said film guide plates and spaced from and extending across the back of the second named of said film guide plates, headed elements mounted on said second named film guide plate and passing through openings in said member for slidably supporting said second named film guide plate, and resilient means acting between said member and said second named film guide plate for resiliently urging said film guide plates together.

2. In a device of the class described having an exciter lamp and lens and photocell, a film guide plate having an aperture for the passage of light from said exciter lamp and lens to said photocell, a film guide plate complementary to and engaging against said film guide plate and having an aperture aligned with said aperture, a member mounted on the first named of said film guide plates and spaced from and extending across the back of the second-named of said film guide plates, headed elements mounted on said second-named film guide plate and passing through openings in said member for slidably supporting said second-named film guide plate, and resilient means acting between said member and said second-named film guide plate for resiliently urging said film guide plates together, comprising helical springs mounted on said headed elements and located between said second-named film guide plate and member.

3. In a device of the class described having an exciter lamp and lens and photocell, a film guide plate having an aperture for the passage of light from said exciter lamp and lens to said photocell, a film guide plate complementary to and engaging against said film guide plate and having an aperture aligned with said aperture, a member mounted on the first-named of said film guide plates and spaced from and extending across the back of the second-named of said film guide plates, headed elements mounted on said second-named film guide plate and passing through openings in said member for slidably supporting said second-named film guide plate, and resilient means acting between said member and said latter mentioned film guide plate for resiliently urging said film guide plates together, said headed elements being located at spaced positions in relation to each other.

4. In a device of the class described having an exciter lamp and lens and photocell, film guide plates having apertures for the passage of light from said exciter lamp and lens to said photocell, a shutter movably mounted on one of said film guide plates and adjustable to cut off portions of said apertures for controlling passage of light through said apertures, said shutter being mounted on tracks on said latter mentioned film guide plate, a lug projecting from said shutter, and a screw rotatively mounted on said latter mentioned film guide plate and threadedly engaging said lug for facilitating said adjusting of said shutter.

EPHIM BORTNICK.